May 2, 1961 F. E. ELLIS 2,982,155
VARIABLE GEAR UNITS
Filed Dec. 19, 1958 4 Sheets-Sheet 1
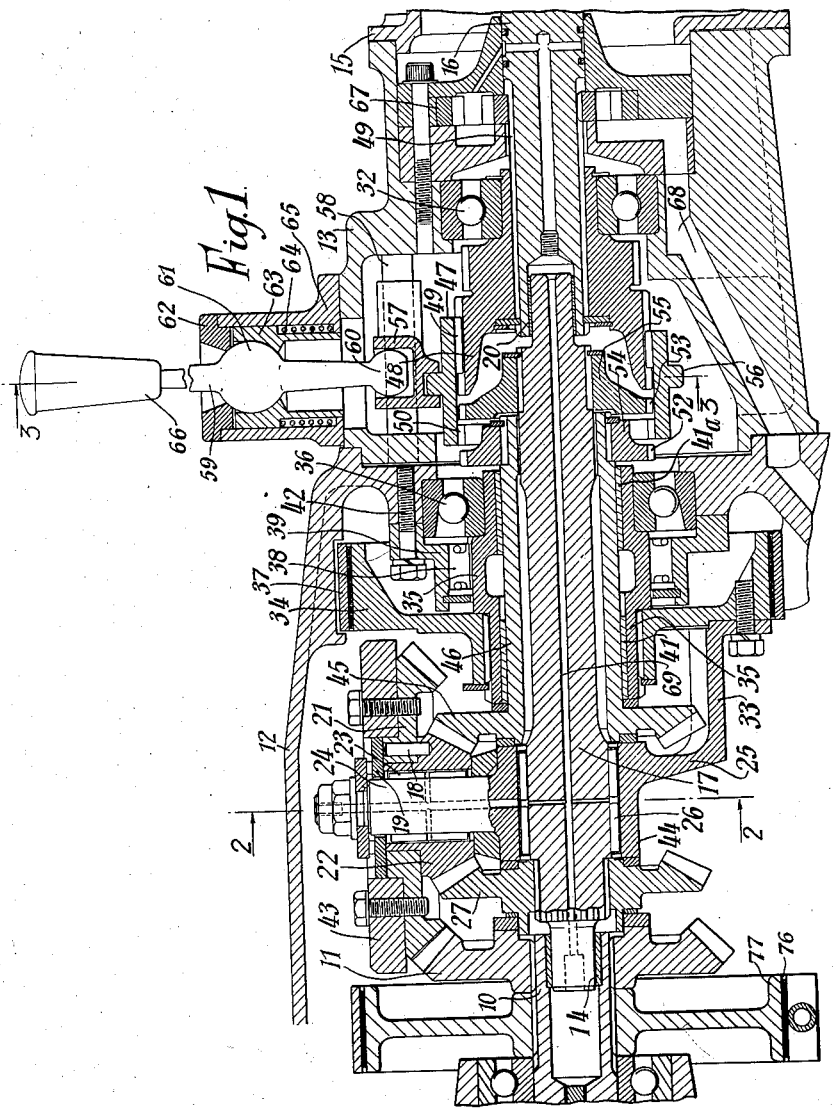
INVENTOR
FREDERICK E. ELLIS
BY
ATTORNEYS

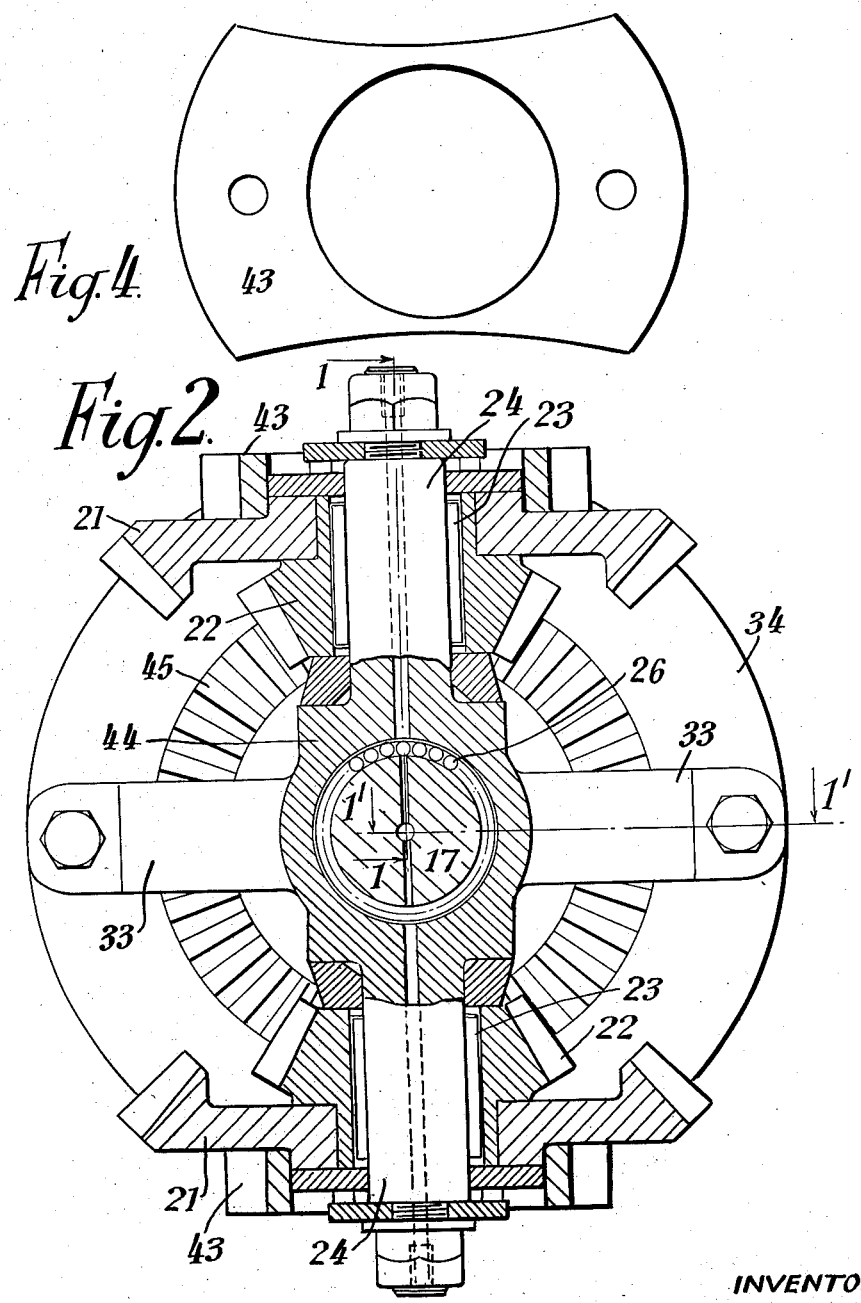

May 2, 1961 F. E. ELLIS 2,982,155
VARIABLE GEAR UNITS
Filed Dec. 19, 1958 4 Sheets-Sheet 4
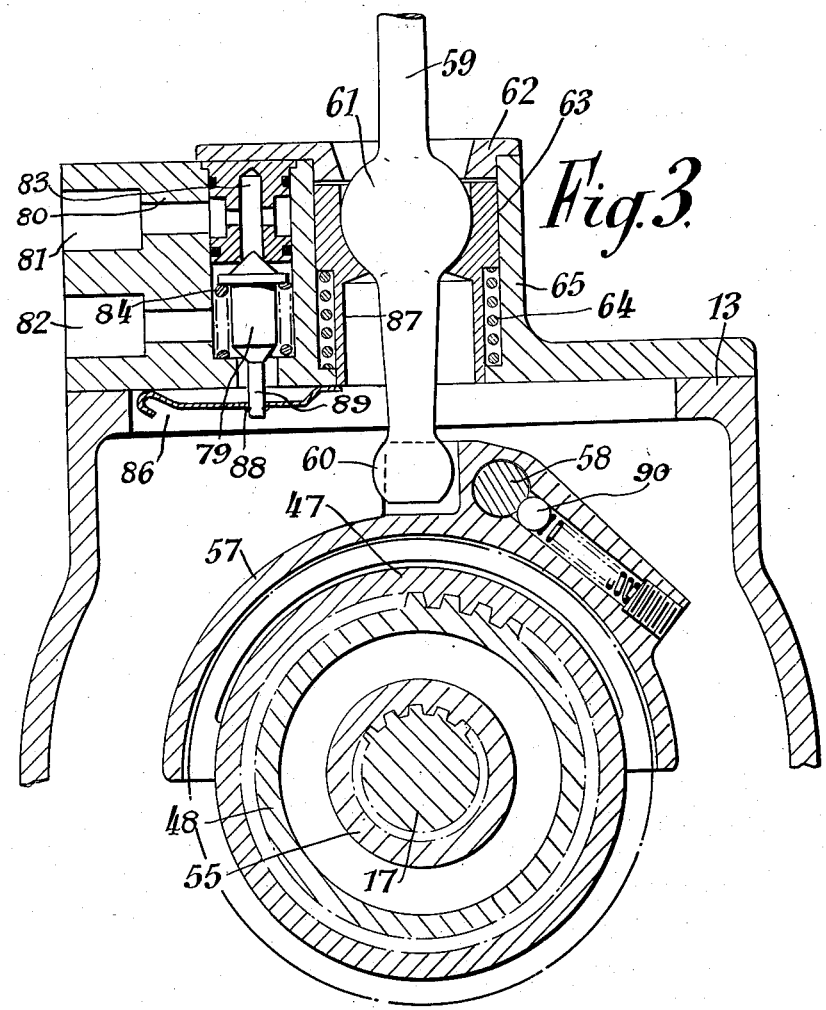
INVENTOR
FREDERICK E. ELLIS
BY
ATTORNEYS

United States Patent Office 2,982,155
Patented May 2, 1961

2,982,155

VARIABLE GEAR UNITS

Frederick E. Ellis, Tachbrook Mallory, near Leamington Spa, England, assignor to Automotive Products Company Limited, Leamington Spa, England, a British company, and Hugh C. Reid, Belfast, Northern Ireland Filed Dec. 19, 1958, Ser. No. 781,696

Claims priority, application Great Britain Dec. 30, 1957

8 Claims. (Cl. 74—752)

This invention relates to two-speed forward and reverse epicyclic gearing in which a main driving bevel wheel and a smaller co-axial forward bevel wheel mesh respectively with an outer planet bevel pinion and an inner smaller bevel pinion. The two gear ratios are different, both pinions being rotatable together about a transverse axis of a planet carrier spindle with the said carrier axis being rotatable only in a forward direction in a plane perpendicular to the common axis of the main driving and forward bevel wheels. Means is provided for preventing rotation of the planet pinions about their axes thus giving a direct drive, or for allowing such rotation but preventing backward rotation of the planet carrier thus giving a drive through the gearing at a different transmission ratio. A reverse bevel wheel co-axial with the forward bevel wheel meshes with the inner planetary pinion on the side thereof opposite to the forward bevel wheel and means is provided for connecting a final rotatable driven shaft or like driven member to the forward or to the reverse bevel wheel.

In this kind of gearing, it is necessary to make provision for preventing rotation of the planet pinions about their axes thus giving a direct drive or for allowing such rotation but preventing backward rotation of the planet carrier thus giving a drive through the gearing at a different transmission ratio.

One method of bringing about this result is disclosed in U. S. patent application Serial No. 663,259, now Patent No. 2,943,518. This method comprises the use of two masses rotatable with a planetary gear about a transverse axis which is rotatable in a plane perpendicular to the common axes of the driving and driven shafts or other elements between which the epicyclic gear is arranged. The two masses are diametrically opposed and balance one another. When the planet carrier is rotating, the two masses are so subjected to centrifugal force that they tend to move into the aforementioned plane and resist strongly any forces tending to move them out of this plane. When they reach such a speed that they overcome the resisting forces, the planet carrier rotates with the driving and driven elements giving the direct drive higher speed.

When the driving torque becomes insufficient to overcome the resisting torque, the two masses are moved forcibly by the resisting torque in opposition to centrifugal force towards the position in which they are parallel to the axis of the driving and driven members of the epicyclic gear. During the changing period, the influence of the centrifugal forces in resisting rotation of the planet pinion diminishes to zero. The planet carrier is then held by ratchet or equivalent mechanism against backward rotation and the lower speed ratio between the driving and driven elements is in operation. The two masses then rotate freely with the planet pinions and the gear functions as a simple reduction gear. This downward change is effected automatically.

The change of gear upwardly is brought about semi-automatically by retardation of the elements, such retardation resulting, for example, from the momentary closing of the throttle or otherwise.

Improvements in this kind if gearing have also been disclosed in the co-pending application Serial No. 800,457 in which a friction or other clutch when operative connects the main driving bevel wheel and the forward bevel wheel to one another to give a direct high ratio drive. The clutch when inoperative enabling an indirect drive through the gearing to become operative, and the planet carrier is then held against backward rotation.

The principal object of the invention is to ensure that the forward and reverse gear changes are brought about without shock or noise.

A further object is to provide a compact assembly of mechanism whereby the several automatic and other controlling operations may be carried out with a minimum movement, effort or thought by the driver of the vehicle to which gear is applied.

In the embodiment of the invention shown by way of example in the accompanying drawings:

Figure 1 shows a vertical longitudinal section with the exception of the lower half of the epicyclic gearing which is a section on the line 1'—1' in Figure 2;

Figure 2 shows a transverse sectional elevation on the line 2—2 in Figure 1;

Figure 3 shows a vertical section on the line 3—3 in Figure 1; and

Figure 4 shows a modified detail of construction.

Figure 1A:
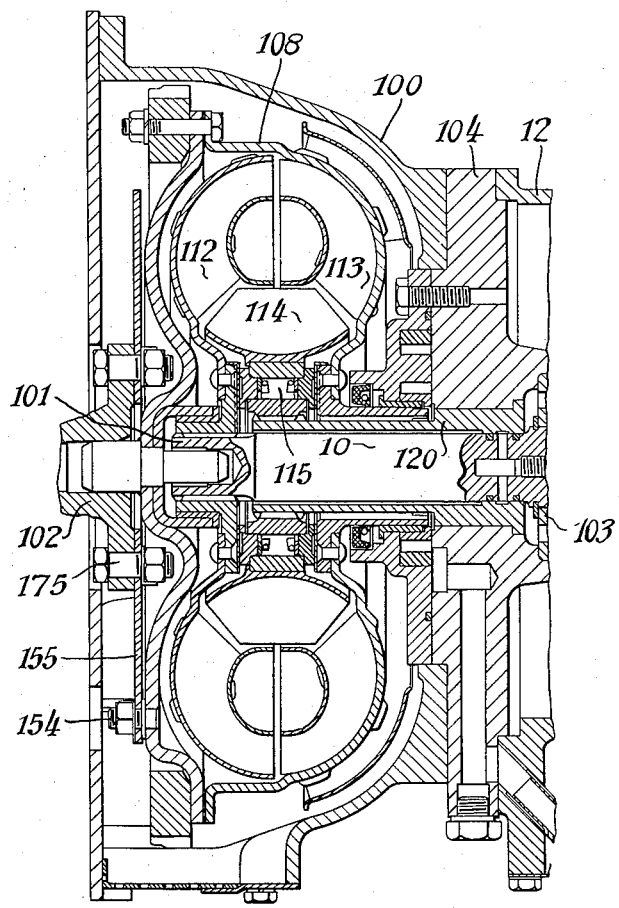
Figure 1A shows a torque converter for the clutch shaft.

Figures 1–3 of the drawings show the variable speed gearing to which the improvements constituting the present invention are applied as well as their association with the driving and driven elements in a motor vehicle transmission system.

The usual clutch shaft 10 transmits engine rotation to the main driving bevel wheel 11 forming the first element of the improved variable speed gearing located within the casing 12. One end of the casing 12 is bolted to the rear closure 104 of the usual clutch housing 100, the forward end of which is bolted to the engine crankcase (not shown). The clutch housing may, for example, enclose a clutch, automatic or otherwise, or a hydro kinetic torque converter of known type as shown in Fig. 1A, to effect the connection or disconnection of the driving bevel wheel 11 from the crankshaft 102 of an engine or from the output shaft of any other prime mover. The bevel wheel 11 is splined to the clutch shaft 10 which may thus be braked without stalling the engine.

The clutch shaft 10 is supported in a spigot beading 101 in the rear end of the engine crankshaft 102 and by a ball bearing 103 supported by the rear closure 104. The rotatable casing 108 of the converter is driven through bolts 154 from a driving plate 155 secured by bolts 175 to the crankshaft 102. The converter employs two rotatable vane elements 112, 113 and one vane element or stator 114 carried on a one-way brake element 115 connected by splines to a nonrotatable sleeve 120 projecting forwardly from the rear closure 104. The rearmost or driving vane element 113 is rotated by the crankshaft and the foremost or driven element 12 or turbine rotates with the clutch shaft 10. The stator is prevented by the one-way brake element 115 from rotating rearwardly.

To the end of the casing 13 there is bolted a rear casing 15 carrying a bearing for the rear end (not shown) of the final driven shaft 16 of the variable speed gear. The front end of the final shaft 16 is supported in the casing 13 by a ball bearing 32.

The front end of an intermediate shaft 17 is rotatably supported by a spigot bearing 14 in the rear end of the clutch shaft 10. The other end of the intermediate shaft is supported from the final driven shaft 16 by means of a spigot bearing 14.

In the two speed gearing forming the subject of the aforementioned patent applications, as utilised in the present application, the main driving bevel wheel 11 meshes with the first or outer bevel planet pinions 21, in the present construction two, arranged to balance about the central longitudinal axis of the clutch shaft 10 and of the intermediate and final driven shafts 17, 16.

Each planet pinion 21 is connected to a second or inner planet pinion 22, the connection including a pin 18 and a clamping plate 19. The two connected pinions are carried by roller bearings 23 on a spindle 24 at right angles to the longitudinal axis of the gearing. The spindle forms part of the planet carrier 25, the hub 44 of the carrier being mounted through the medium of roller bearings 26 on the intermediate shaft 17. Two opposed groups of planet pinions 21, 22 are employed in this condition.

The smaller planet pinions 22 mesh with a forward bevel wheel 27 splined on the intermediate shaft 17.

The hub 44 of the planet carrier 25 is connected by arms 33 to a brake drum 34 or other braking element which is connected rigidly by splines or otherwise to a sleeve 35. The planet carrier 25, the brake drum 34 and the sleeve 35 thus rotate as a whole and are supported at the front end by bearing rollers 26 on the intermediate shaft 17 and at the rear end by a ball bearing 36 having its outer race mounted in the casing 12. The planet carrier assembly may be held against rotation in either direction by a brake band 37 applied to the drum 34 or by equivalent braking means. Alternatively, the planet carrier may be held against backward rotation by a one-way brake 38 interposed between the sleeve 35 and a fixed ring 39 connected by bolts 42 to the rear end of the casing 12. In the arrangement shown, two planet spindles 24 are arranged in line on opposite sides of the hub 44 and the arms 33 are located between them.

The two speed gearing shown in the drawings is characterized by the provision on each of the first or outer planetary pinions 21 of two masses 43 rotatable with the pinions 21, 22. The two masses on each planet pinion are balanced about the axes of the spindle 24 of the carrier.

The forward bevel wheel 27 is driven forwardly by the main driving bevel wheel 11 at either, a low speed when the planet carrier 25 is held against backward rotation by the one-way brake 38, or at a high speed when the carrier is rotated forwardly with the bevel wheels 11, 27. The balanced masses 43 are inoperative at the low speed. As the speed of rotation of the planet carrier increases to a predetermined value, the two masses 43 on each planet pinion 21 exert sufficient force to stop rotation of the masses and pinions 21, 22 about the carrier spindles 24 so that the gear wheels and planet pinions all rotate only about the axis of the shaft 17. This gives the higher direct speed ratio.

The low speed ratio depends upon the difference between the speed ratios of (1) the driving bevel wheel 11 and the outer planet pinion 21 and (2) the inner planet pinion 22 and the forward bevel wheel 27. In the construction shown the first ratio is unity and the second or low speed ratio is 1:1.7. This is shown in Figure 1 by the difference between the conical angle of pitch surface of the outer gears 21, 11, namely 45°, and that of the inner gears 22, 27.

Provided that the masses 43 have a suitable value in relation to the dimensions of the gearing, a smooth transfer from one speed to the other will be obtained.

The present invention has for its object to modify the two-speed gear disclosed in the aforementioned prior applications so as to provide a reverse drive and a neutral adjustment since the original mechanism provided only has two forward speeds giving a smooth transfer from one speed to the other.

In the present invention the single driven shaft is replaced by the intermediate shaft 17 and the final driven shaft 16. Also, a reverse bevel wheel 45 is provided together with means for connecting the driven shaft 16 to either the forward bevel wheel 27 or the reverse bevel wheel 45. The two bevel wheels 27, 45 rotate oppositely since they mesh with opposite sides of the smaller second planetary pinions 22. The reverse bevel wheel 45 is shown integral with a hollow shaft 46 which is mounted by means of plain bushes 41a within the sleeve 35.

During forward low gear running or reverse gear running, the planet carrier is held by the one-way brake 38 or by the brake drum 34 against backward rotation.

The carrier brake drum 34 may be held by application of its brake band or other braking element for vehicle speeds up to, for example, 25 miles per hour, so that the vehicle is held in low gear whether the driving conditions are suitable or unsuitable for an upward change. Above this speed, the drum may be released and the one-way brake 38 then allows an upward direct drive gear range to become operative. The change of gear is effected semi-automatically by a small change in the rate of rotation of the gears, for example, by retardation resulting from a momentary part closing of the throttle when the accelerated pedal is momentarily raised. If the brake band is not applied, reverse rotation of the planet carrier is prevented by the one-way brake 38 only so that the gear will be changed upwards upon any lifting of the accelerator pedal whenever the driving conditions are suitable.

The means for coupling the final driven shaft 16 to either the forward bevel wheel 27 or the reverse bevel wheel 45 will now be described, there being an intermediate or neutral position between the two adjustments.

This operation is effected by an internally splined actuating ring 47 concentric with the intermediate shaft 17 and the driven shaft 16 and adjustable axially. The rearward splines 49 slidably engage the forward end of a fitting 48 having a rearward part of reduced diameter which is interposed between the inner race of the ball bearing 32 and the forward end of the driven shaft 16, the sleeve being permanently connected to the shaft by splines 49.

Splines 50, separated from the similar splines 49, are provided inside the ring 47 and are adapted when adjusted forwardly, to engage corresponding splines 52, on a circular fitting 54 connected to the rear end of the reverse gear shaft 46 when the ring 47 is adjusted rearwardly. The splines 50 similarly engage splines 53 on a circular fitting 55 connected to the intermediate shaft 17. Forward adjustment of the sleeve 47 thus engages the reverse gear while rearward adjustment engages the forward gear.

The actuating ring 47 is connected to the selector lever 59 by a selector fork 57 slidable on a selector rod 58 fixed in the casing 13. The fork engages a concentric shoulder 56 on the ring 47, and the spherical or cylindrical lower end 60 of the selector lever 59 engages a recess in the fork 57.

The actuating lever is formed with a ball 61 which is mounted in a cylindrical shell 65 between a fixed upper socket 62 and a lower socket 63 loaded by a spring 64.

The handle or knob 66, on the upper end of the lever 59 enables the driver of a vehicle to adjust the lever forwardly to engage the forward low gear and rearwardly to engage the reverse gear having the same reduction ratio as the lower forward gear. The gear lever and parts actuated thereby are held in the forward, neutral or reverse positions by a spring operated ball and detent type lock 90 on the selector rod 58.

When carrying out the reversing operation it is essential that the two splined circular fittings 54 and 55 should both be brought to rest before the actuating ring 47 is moved in either direction to engage one or the other according to whether the change is to be made from a forward drive to a reverse drive or vice versa. These two members 54, 55 are connected respectively to the reverse gear wheel 45 and the forward gear wheel 27. When the car comes to rest, the splined fitting 48 and the final drive shaft 16 no longer rotate, but the two fittings 54 and 55 will rotate in opposite directions due to the planetary pinion 21 being driven by the main driving bevel wheel 11 from the clutch shaft 10. In order to bring these two splined members 54, 55 to rest it is necessary to stop the rotation of the main driving bevel wheel 11 and the clutch shaft 10 to which it is splined. This incidentally brings the driven member of the hydro kinetic torque converter (not shown) connected to the clutch shaft 10 to rest.

This action may be brought about by applying a brake band 76 to the brake drum 77 which rotates with the main driving bevel wheel 11. This operation is brought about by a small amount of downward movement imparted to the handle 66 when the mechanism is actuated for a reverse or forward gear engagement. As described previously in connection with Figures 1 and 3 of the drawings, the handle 66 is held in its raised position by a spring 64, but may be pressed downwards to a very limited extent so as to actuate a valve 79 controlling the supply of fluid under pressure to the brake band 76 on the reversing brake drum 77.

Referring particularly to Figure 3, there is attached to the side of the shell 65 on the casing 13 a block 80 provided with an inlet conduit 81 connected to a source of fluid under pressure and an outlet conduit 82 leading to an operating cylinder for the brake band 76 encircling the reversing drum 77. The valve 79 between these two conduits is opened by the small downward movement of the handle 66 previously referred to. The valve is normally held in its upward position by a helical spring 84 so that its conical end engages a seat closing the connection 83 to the inlet conduit 81. The valve is pressed downwards by the handle 66 through the medium of a leaf spring 86. One end of the spring is actuated by downward movement of the downward extension 87 from the part-spherical socket 63 on which the ball 61 of the handle bears. The lower edge of this extension 87 engages the free end of the spring 86, the other end of which acts as a fulcrum. The spring 86 is normally raised to its uppermost position by the spring 84 acting on the small valve 79, the connection between the two being formed by a circlip 88 on the lower end of the stem 89 of the valve. When the handle is depressed, the valve 83 moves downwards sufficiently to open the upper conduit and connect it to the lower conduit, while escape of fluid under pressure is prevented by the lower conical end of the valve engaging the lower seating. As soon as the handle is released it is raised by the spring 64 so that the valve 83 opens the lower conduit and closes the upper conduit. The extensions of the inlet and outlet conduits 81, 82 to a pressure pump and to the brake operating means are not shown.

Two separate masses 43 may be used as described, each secured by set bolts or the like to the outer planet pinion 21. Preferably a single metal disc is machined to the shape shown in Figure 4 and mounted as shown in Figures 1 and 2, to provide the equivalent of two separated balanced masses and thus obtain the same result in a simpler and more effective manner.

A rotary pump 67 actuated from the final driven shaft 16 draws oil from the sump through a conduit 68 and forces the oil under pressure to the several parts requiring lubrication through passages 69 in the shafts.

What is claimed is:

1. Two speed forward and reverse epicyclic gearing comprising in combination: co-axial driving, driven and intermediate shafts; a main driving bevel wheel on the driving shaft, and a smaller co-axial forward bevel wheel on the intermediate shaft; an outer planet bevel pinion meshing with said main driving bevel wheel; a smaller inner planet bevel pinion meshing with said forward bevel wheel, both of said bevel pinions being connected so as to rotate together; a planet carrier having a transverse spindle upon which the said bevel pinions are mounted; a one-way brake preventing backward rotation of the planet carrier; two balanced masses secured to the planet bevel pinions whereby changes between the forward transmission ratios may be carried out automatically; a reverse bevel wheel meshing with the inner bevel pinion on the side thereof opposite to the forward bevel wheel; two toothed clutch members each rotatable with a rearward extension from the forward and the reverse bevel wheels, respectively; a cooperating clutch member on the driven shaft; a selector lever for actuating said clutch members so as to engage the forward wheel or the reverse wheel; a brake drum rotatable with the main driving bevel wheel; means for adjusting the selector lever in a direction transverse to the gear selecting movement when the driven shaft is stationary so as to apply a braking element to said brake drum and thus bring the said toothed clutch members to rest whereby, in the said combination, the forward gear changes may be made automatically and without shock and the forward and reverse gear changes may be made without shock.

2. Forward and reverse gearing comprising, in combination: a fixed casing; co-axial driving, driven, and intermediate shafts mounted in said casing for rotation with respect to each other and to the casing; a main driving bevel wheel on the driving shaft, and a smaller forward bevel wheel on the intermediate shaft; an outer planet bevel pinion meshing with said main driving wheel, and a smaller inner planet bevel pinion meshing with said forward bevel wheel, said bevel pinions being connected so as to rotate together; a planet carrier rotatably mounted on said intermediate shaft and having a spindle upon which the said bevel pinions are rotatably mounted; a reverse bevel wheel rotatably mounted and meshing with the inner bevel pinion on the side thereof opposite to the forward bevel wheel; a one-way brake connected between said carrier and the casing and preventing backward rotation of the planet carrier; centrifugally operated means on the carrier operative to effectively rigidly connect the main driving bevel wheel and the forward bevel wheel to one another to give a high speed forward drive and when inoperative enabling a low speed indirect forward drive to become operative through the gearing connection from the main driving bevel wheel through the planet pinions to the forward bevel wheel and the reverse bevel wheel; toothed clutch members connected to the forward and the reverse bevel wheels respectively; a clutch member on the driven shaft selectively cooperable with each of said clutch members; a selector lever actuating said cooperable clutch member so as to selectively engage the clutch members of the forward gear and the reverse gear; a brake drum rotatable with the main driving bevel wheel, a braking element; means controlled by the selector lever to apply the braking element to said brake drum and thus bring the said toothed clutch members to rest, whereby the forward and reverse gear changes may be effected without shock.

3. Gearing according to claim 2 comprising an internally splined ring movable by the actuating lever, the clutch members rotatable with the forward bevel wheel, the reverse bevel wheel and the final driven shaft being splined and located adjacent one another axially to enable the internally splined ring to mesh with the splined clutch members and thereby to selectively connect the forward and reverse bevel wheels rotatably with the said driven shaft.

4. Gearing according to claim 3, in which the forward bevel wheel and the corresponding splined clutch member are secured to opposite ends of the intermediate shaft and the reverse bevel wheel is connected to the corresponding splined clutch member by a tubular shaft.

5. Gearing according to claim 3, in which said internally splined ring is operated axially by the selector lever and the splined clutch members of the bevel wheels are spaced apart a distance greater than the length of the splines on the splined ring so as to render the actuating ring selectively adjustable into forward, neutral, and reverse driving positions.

6. Gearing according to claim 2 comprising a braking element connected rigidly to the planet carrier, a sleeve splined thereto and connected to the rotatable member of the one way brake, the reverse bevel gear being rotatably supported by said sleeve and located between the planet carrier and said braking element.

7. Gearing according to claim 2 wherein the driving shaft supports and drives the main driving bevel wheel, the intermediate shaft to which the forward bevel wheel is connected being supported by the said driving shaft and by the driven shaft.

8. Gearing according to claim 2, comprising a braking element connected rigidly to the planet carrier and to the rotatable member of the one way brake, the carrier being held against rotation in either direction when the brake is applied thereby to maintain the low gear in operation thus overriding the centrifugally operated means.

References Cited in the file of this patent

UNITED STATES PATENTS

| | | |
|---|---|---|
| 1,039,743 | Holliday | Oct. 1, 1912 |
| 1,610,284 | Hintze | Dec. 14, 1926 |
| 2,247,578 | Giroud et al. | July 1, 1941 |

FOREIGN PATENTS

| | | |
|---|---|---|
| 692,079 | France | Oct. 30, 1930 |